United States Patent Office 3,600,437
Patented Aug. 17, 1971

3,600,437
SUBSTITUTED PHENYLALKANOIC ACIDS AND DERIVATIVES THEREOF
Winston S. Marshall, Indianapolis, Ind., assignor to Eli Lilly and Company, Indianapolis, Ind.
No Drawing. Continuation-in-part of applications Ser. No. 752,801, Aug. 15, 1968, and Ser. No. 823,477, May 9, 1969. This application May 28, 1969, Ser. No. 828,756
Int. Cl. C07c 65/00, 149/40
U.S. Cl. 260—520
6 Claims

ABSTRACT OF THE DISCLOSURE

Novel alkanoic acids, substituted by 3-phenoxyphenyl or 3-phenylthiophenyl groups, and the esters, amides, amines, alcohols, ethers, tetrazoles, carbamates, and ureas related thereto as well as novel intermediates useful in the preparation of such compounds. The compounds of this invention are useful as antiinflammatory, analgesic, and antipyretic agents.

CROSS-REFERENCE TO RELATED APPLICATIONS

This is a continuation-in-part application of my copending application Ser. No. 752,801, filed Aug. 15, 1968, now abandoned, and of my application 823,477 filed May 9, 1969, now abandoned.

BACKGROUND OF THE INVENTION

This invention relates to novel 3-phenoxyphenyl or 3-phenylthiophenyl alkanoic acids, their pharmaceutically acceptable cationic salts, and the corresponding esters, amides, amines, alcohols, ethers, tetrazoles, carbamates, and ureas having antiinflammatory activity and mild, aspirin-like, analgesic and anti-pyretic activity.

A number of humans and animals are known to suffer from various rheumatic conditions involving inflammation, swelling, tenderness, decreased mobility, pain, and fever. While there are a number of presently available anti-inflammatory agents which have been found to be effective in the symptomatic treatment of conditions such as rheumatoid arthritis, rheumatoid spondylitis, degenerative joint disease (osteoarthritis) of the hip, such agents have a number of undesirable side effects. Thus, the search for improved anti-inflammatory agents continues.

The present invention provides novel compounds which are excellent anti-inflammatory agents, and which, in addition to their anti-inflammatory activity, exhibit mild, aspirin-like analgesic and anti-pyretic activity.

SUMMARY

This invention relates to novel 2-(3-phenoxyphenyl) or 2-(3-phenylthiophenyl)alkanoic acids, their pharmaceutically acceptable cationic salts, and the esters, amides, amines, alcohols, ethers, tetrazoles, carbamates, and ureas related thereto, to novel pharmaceutical compositions useful in the treatment of inflammation, pain, and fever in humans and animals, and to intermediates useful in the preparation of such compounds. Some of the compounds of this invention also greatly enhance the analgesic activity of a number of analgesic agents.

It is a primary object of this invention to provide novel 3-phenoxyphenyl or 3-phenylthiophenyl alkanoic acids and the esters, amides, amines, alcohols, ethers, tetrazoles, carbamates, and ureas related thereto.

Still a further object is to provide therapeutic compositions for the relief of inflammation, and the accompanying pain, swelling, fever, and the like in man and animals.

A further object is to provide methods for treating inflammation in man and animals.

Further objects will become apparent to those skilled in the art from the following description and claims.

DETAILED DESCRIPTION OF PREFERRED EMBODIMENTS

The novel 3-phenoxyphenyl and 3-phenylthiophenyl alkanoic acids, their pharmaceutically acceptable cationic salts, and the corresponding esters, amides, amines, alcohols, ethers, carbamates, tetrazoles, and ureas of this invention are represented by general Formula I:

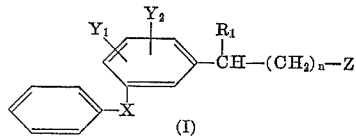

(I)

wherein:

X is oxygen or sulfur;
$Y_1$ is hydrogen, hydroxy, amino, nitro, halo, methyl, ethyl, $C_1$–$C_3$ alkoxy, methanesulfonyl, methanesulfonamido, trifluoromethyl, acetamido, or methylmercapto;
$Y_2$ is hydrogen, hydroxy, halo, methyl, or ethyl, but is hydrogen when $Y_1$ is hydroxy or $C_1$–$C_3$ alkoxy;
$R_1$ is hydrogen, $C_1$–$C_5$ alkyl, $C_2$–$C_5$ alkenyl, $C_2$–$C_5$ alkynyl, or $C_3$–$C_6$ cycloalkyl;
$n$ is an integer from 0 to 3; and
Z is either:
(a) —COOR$_2$, R$_2$ being hydrogen, $C_1$–$C_5$ alkyl, di($C_1$–$C_3$)alkylamino($C_1$–$C_4$)alkyl, 2-(3-phenoxyphenyl)propyl, or an alkali metal, alkaline earth metal, aluminum, ammonium, or substituted ammonium cation;

(b)

wherein each $R_3$ is the same or a different member of the group consisting of hydrogen, hydroxy, $C_1$–$C_5$ alkyl, cyclopropylmethyl, or —CH$_2$—COOR$_2$;
(c) —CH$_2$OR$_4$, R$_4$ being hydrogen, $C_1$–$C_5$ alkyl, acetyl, propionyl, carbamyl, N-methylcarbamyl, N,N-dimethylcarbamyl, or $C_3$–$C_6$ alkoxyalkyl;

(d)

(e) when $n = 1$–$3$,

wherein each $R_5$ is the same or different member of the group consisting of:

(1) Hydrogen, $C_1$–$C_5$ alkyl, cyclopropyl, or cyclopropylmethyl;
(2) Acetyl, propionyl, N-methyl carbamyl, or N,N-dimethyl carbamyl; and the pharmaceutically acceptable acid addition salts of the basic members thereof.

"Alkali metal," as used herein, refers to sodium, potassium, and lithium.

"Alkaline earth metal" refers to calcium, magnesium, and barium.

The term "substituted ammonium" includes methyl ammonium, diethyl ammonium, benzyl ammonium, triethanol ammonium, and the like.

The term "acid addition salts" refers to salts prepared by reacting the free amine with an organic or inorganic acid. Representative salts include the hydrochloride, hydrobromide, sulfate, bisulfate, acetate valerate, oleate, laurate, borate, benzoate, lactate, phosphate, tosylate, citrate, maleate, fumarate, succinate, tartrate, napsylate (salt of 2-naphthalenesulfonic acid) and the like.

"$C_1$–$C_5$ alkyl" refers to both straight and branched chain alkyls including methyl, ethyl, n-propyl, iso-propyl, n-butyl, sec-butyl, tert-butyl, iso-butyl, n-amyl, iso-amyl, neo-pentyl, and the like.

"$C_2$–$C_5$ alkenyl" refers to the $C_2$–$C_5$ alkyl groups, as defined above, from which a hydrogen atom has been removed from each of two adjacent carbon atoms to produce ethylenic unsaturation; e.g., vinyl, allyl, methallyl, 1-pentenyl, and the like.

"Halo" includes chloro, fluoro, bromo, and iodo.

"$C_2$–$C_5$ alkynyl" refers to the $C_2$–$C_5$ alkyl groups as defined above, from which two hydrogen atoms have been removed from each of two adjacent carbon atoms to produce acetylenic unsaturation; e.g., ethynyl, propargyl, 2-butynyl, 1-pentynyl, and the like.

"$C_3$–$C_7$ cycloalkyl" includes cyclopropyl, cyclobutyl, cyclopentyl, cyclohexyl, and cycloheptyl.

"$C_1$–$C_3$ alkoxy" refers to methoxy, ethoxy, and propoxy.

Compounds represented by general Formula I are excellent anti-inflammatory agents, many of them having an $ED_{50}$ of from 0.2–1.0 mg./kg. in the erythema blocking assay. All of the compounds of this invention are useful in the treatment of inflammatory diseases in mammals, the acids and amines being preferred embodiments thereof. In addition to their anti-inflammatory activity, the compounds exhibit mild analgesic and antipyretic activity. Therapeutic compositions comprising, as their active ingredient(s), one or more compounds of general Formula I in association with a pharmaceutically acceptable diluent or carrier, are also provided by this invention. The compounds are generally administered to mammals in dosages of from 0.5–5.0 mg./kg. of body weight daily, either in single or divided doses over a period of 24 hours.

It is to be understood that both the $d$ and $l$ isomers of the α-alkyl compounds of this invention are contemplated within the scope of the invention. Thus, for example, the α-alkyl acids can be resolved into their $d$ and $l$ isomers by methods well known in the art. Both the $d$ and $l$ isomers have been found to have substantially identical activity. Thus, either the racemic mixture, or the $d$ and $l$ isomer can be employed in the treatment of inflammation, pain, and fever in mammals.

Some of the compounds of the invention, particularly those wherein Y and $Y_2$ are hydrogen, $n$ is O, $R_1$ is hydrogen, methyl, or ethyl, and Z is COOH, or a salt thereof, have surprisingly been found to enhance the level of analgesia obtained with certain analgesic agents such as the esters of 1,2-diphenyl-2-hydroxy-3-methyl 4(substituted amino)butanes, particularly α-d-propoxyphene (identified chemically as α-d-1,2-diphenyl-2-propionoxy-3-methyl-4-dimethylaminobutane), and certain narcotic analgesic agents such as morphine, codeine, and the like, when co-administered therewith.

Enhancement of analgesia is effected when about one part by weight of a compound of this invention is administered substantially simultaneously, that is, co-administrated, or administrated from 1 hour before to 1 hour after the administration of from 0.005 to 20 parts by weight of the analgesic agent. Generally speaking, in order to obtain a greater level of analgesia, from 0.5 to 50 mg./kg. of a compound of this invention is administered with the usual therapeutic dosage of the analgesic agent.

Representative compounds of the present invention include the following:

2-Cyclohexyl-2-(3-phenoxyphenyl)acetic acid
2-Vinyl-2-(4-chloro-3-phenylthiophenyl)acetic acid
2-Propargyl-2-(3-phenoxyphenyl)acetic acid, sodium salt
5-(3-phenoxybenzyl)-1H-tetrazole
2-(2,5-dichloro-3-phenoxyphenyl)acetic acid
2-(2,5-dimethyl-3-phenylthiophenyl)acetic acid
2-(2-fluoro-5-ethyl-3-phenoxyphenyl)acetic acid
2-(4-iodo-6-hydroxy-3-phenylthiophenyl)propionic acid
2-(2,5-dibromo-3-phenylthiophenyl)butyric acid
2-(4-ethoxy-3-phenoxyphenyl)propionic acid
d-2-(3-phenylthiophenyl)propionic acid
d-2-(3-phenoxyphenyl)propionic acid
2-(1-pentyl)-2-(3-phenoxyphenyl)acetic acid
2-Cyclopropyl-2-(2,5-dichloro-3-phenoxyphenyl)acetic acid
2-(3-phenoxyphenyl)acetic acid
2-(3-phenoxyphenyl)propionic acid, sodium salt, dihydrate
2-(3-phenoxyphenyl)propionic acid, calcium salt, dihydrate
2-(4-methyl-3-phenoxyphenyl)acetic acid
2-(4-hydroxy-3-phenoxyphenyl)acetic acid
2-(4-nitro-3-phenoxyphenyl)acetic acid
2-(4-methoxy-3-phenoxyphenyl)acetic acid
2-(4-chloro-3-phenoxyphenyl)propionic acid
2-(4-chloro-3-phenoxyphenyl)acetic acid
l-2-(3-phenoxyphenyl)propionic acid, sodium salt
2-(2-iodo-5-phenylthiophenyl)acetic acid
2-(5-chloro-3-phenoxyphenyl)acetic acid
2-(2-chloro-3-phenoxyphenyl)acetic acid
2-(2-methanesulfonamido-3-phenoxyphenyl)butyric acid
2-(2-methanesulfonamido-3-phenoxyphenyl)butyric acid
2-(2-amino-3-phenoxyphenyl)butyric acid
2-(2-methyl-5-phenoxyphenyl)acetic acid
2-(3-phenoxyphenyl)propionic acid
2-(5-propoxy-3-phenylthiophenyl)butyric acid
2-(2-fluoro-5-phenoxyphenyl)acetic acid
2-(2-ethyl-3-phenoxyphenyl)propionic acid, calcium salt
2-(5-chloro-3-phenoxyphenyl)propionic acid
2-(3-phenoxyphenyl)propanol
2-(2-acetamido-5-phenylthiophenyl)propionic acid
Methyl 2-(3-phenoxyphenyl)propionate
Ethyl 2-(3-phenoxyphenyl)acetate
Ethyl 2-(3-phenoxyphenyl)propionate
2-cyclopropyl-2-(3-phenoxyphenyl)acetic acid
2-(diethylamino)ethyl 2-(3-phenoxyphenyl)propionate
2-(3-phenoxyphenyl)propyl 2-(3-phenoxyphenyl)propionate
2-(3-phenoxyphenyl)propionamide
2-(3-phenoxyphenyl)ethylcarbamate
N-methyl-2-(3-phenoxyphenyl)propionamide
N-methyl-2-(3-phenoxyphenyl)propylcarbamate
N,N-dimethyl-2-(3-phenoxyphenyl)propionamide
N,N-dimethyl-2-(3-phenoxyphenyl)-n-pentyl carbamate
N-cyclopropylmethyl-2-(3-phenoxyphenyl)propionamide
2-(5-methylmercapto-3-phenoxyphenyl)acetic acid
2-(3-phenylthiophenyl)acetic acid
2-ethynyl-2-(4-methanesulfonyl-3-phenoxyphenyl)acetic acid
2-(3-phenylthiophenyl)propionic acid
2-(3-phenylthiophenyl)butyric acid
2-(3-phenylthiophenyl)valeric acid
2-(3-phenylthiophenyl)acetic acid, ammonium salt
2-(4-hydroxy-3-phenylthiophenyl)acetic acid
2-(4-methyl-3-phenylthiophenyl)propionic acid, sodium salt
2-(2-trifluoromethyl-5-phenoxyphenyl)propionic acid
2-(4-chloro-3-phenylthiophenyl)propionic acid
2-(4-chloro-3-phenylthiophenyl)acetic acid
2-(5-chloro-3-phenylthiophenyl)acetic acid, benzylamine salt
2-(2-chloro-3-phenylthiophenyl)propionic acid
2-(2-methyl-5-phenylthiophenyl)acetic acid
2-(2-fluoro-5-phenylthiophenyl)propionic acid
2-(3-phenoxyphenyl)ethylamine
N-cyclopropyl-2-(3-phenoxyphenyl)butylamine maleate
2-(5-bromo-3-phenylthiophenyl)acetic acid, calcium salt
2-(3-phenylthiophenyl)propanol
Methyl 2-(3-phenylthiophenyl)propionate
Ethyl 2-(3-phenylthiophenyl)propionate
2-diethylaminoethyl 2-(3-phenylthiophenyl)propionate
2-(3-phenylthiophenyl)propyl 2-(3-phenylthiophenyl)acetate 2-(3-phenylthiophenyl)propionamide
2-(3-phenoxyphenyl)propionohydroxamic acid
N-cyclopropylmethyl-2-(3-phenoxyphenyl)propylamine hydrochloride
N-methyl-2-(3-phenoxyphenyl)propylamine sulfate
N,N-dimethyl-2-(3-phenoxyphenyl)propylamine hydrochloride
2-(3-phenoxyphenyl)butyric acid
2-(3-phenoxyphenyl)valeric acid
2-(3-phenoxyphenyl)caproic acid
2-(3-phenoxyphenyl)enanthic acid
3-(3-phenoxyphenyl)butyric acid
2-(3-phenoxyphenyl)propylamine hydrochloride
2-(3-phenoxyphenyl)butylamine sulfate
1-methyl-3-[2-(3-phenoxyphenyl)propyl]urea
1,1-dimethyl-3-[2-(3-phenoxyphenyl)propyl]urea
Ethyl 3-(3-phenoxyphenyl)butyrate
3-(3-phenoxyphenyl)butanol
3-(3-phenoxyphenyl)butyl acetate
2-(3-phenoxyphenyl)propyl propionate
N-[3-(3-phenylthiophenyl)butyl]acetamide
5-(α-methyl-3-phenoxybenzyl)-1H-tetrazole
N-[2-(3-phenoxyphenyl)propyl]acetamide
N-[2-(3-phenoxyphenyl)propyl]propionamide
4-(3-phenoxyphenyl)valeramide
5-(3-phenoxyphenyl)caproic acid, aluminum salt
2-(3-phenylthiophenyl)acetamide
2-(3-phenylthiophenyl)butyramide
N-methyl-2-(3-phenylthiophenyl)propionamide
N-cyclopropylmethyl-2-(3-phenylthiophenyl)propionamide The compounds of this invention can be prepared by methods which are well known for the preparation of phenylacetic acids, phenylpropionic acids, and derivatives thereof. While various routes can be employed in obtaining the compounds of this invention, a number of the preferred reaction sequences are represented and described hereinbelow. In the following representations and discussion, $R_1$–$R_5$ are as defined in Formula I, and "Ar" represents the

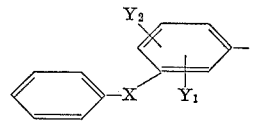

moiety of Formula I.

(A) ACIDS (I)

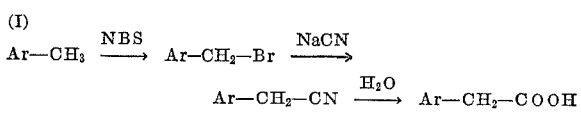

The methyl group of a suitable meta-methyl diaryl ether or diaryl thioether is halogenated by the action of N-bromosuccinimide, N-chlorosuccinimide, sulfurylchloride, or like halogenating agent, with a suitable catalyst, such as benzoyl peroxide or azo bis-iso-butyronitrile, in an inert solvent such as carbon tetrachloride, or other halogenated hydrocarbon. The resulting halomethyl diaryl ether or thioether is caused to react with sodium or potassium cyanide, advantageously in dimethyl sulfoxide solution. The nitrile thus obtained is hydrolyzed to the corresponding carboxylic acid by the action of either acidic or basic reagents by methods well known in the art.

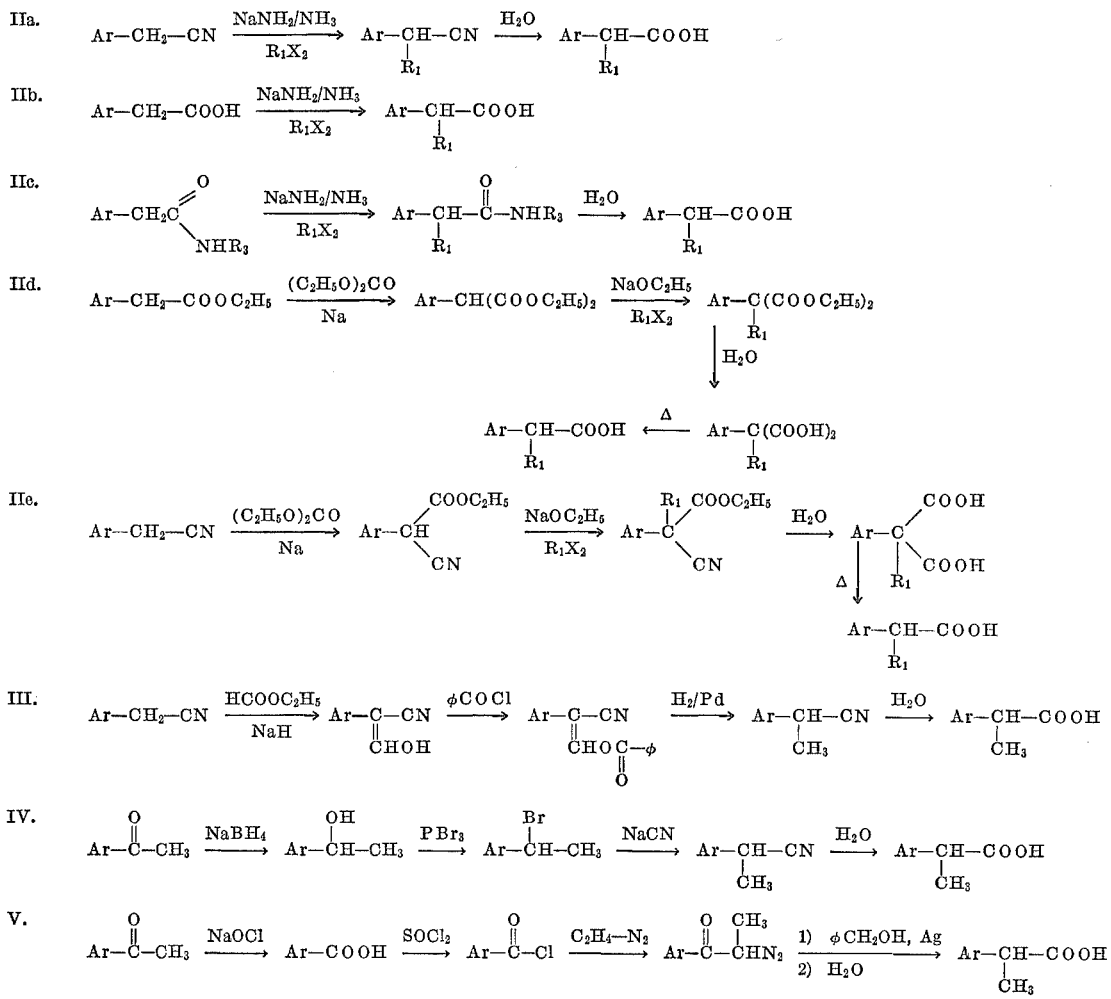

VI. 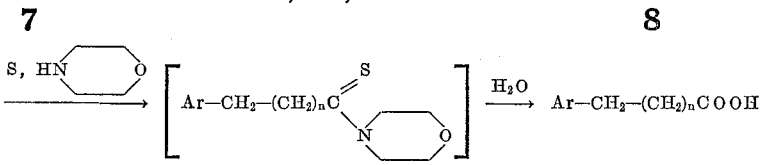

VIIa. 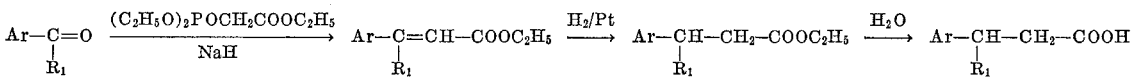

VIIb. 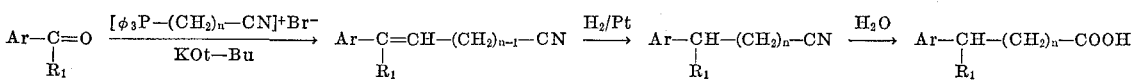

The nitrile prepared in the above illustration can be alkylated with an aliphatic halide or tosylate ($R_1X_2$) in liquid ammonia in the presence of sodium amide to provide an α-aliphatic substituted nitrile. The alkylated nitrile is hydrolyzed as above to yield the corresponding carboxylic acid (Sequence IIa). In a similar fashion, an arylacetic acid or arylacetamide may be alkylated α- to the carboxyl group, as illustrated in reaction sequence IIb–IIc. In the case of the arylacetamide, the resulting α-alkyl derivative can be hydrolyzed to the corresponding carboxylic acid if desired.

In another method, as illustrated in sequences IId and IIe, an arylacetate ester, such as the ethyl ester, or an arylacetonitrile can be converted to the corresponding malonic ester or cyanoacetic ester by the action of metallic sodium and diethyl carbonate. Either of these derivatives may then be alkylated. Such alkylation is usually effected by reacting the malonic ester or cyanoacetic ester with a strongly basic reagent, such as sodium ethoxide, sodium methoxide, potassium tert-butoxide, sodium hydride, and the like, thereby forming a carbanion on the α-carbon atom. Subsequent treatment of the carbanion intermediate with an alkylating agent, such as an alkyl halide or tosylate ($R_1X_2$) wields the corresponding α-alkyl malonic ester or cyanoacetic ester derivative. Either of these may be hydrolyzed to the corresponding α-alkylaryl malonic acid which is then decarboxylated by methods well known in the art; thus yielding the desired α-alkyl arylacetic acid.

A nitrile prepared according to reaction sequence I can optionally be methylated according to the following procedure (Sequence III): The nitrile is condensed with ethyl formate under basic conditions, for example, in the presence of sodium hydride or sodium methoxide in an inert hydrocarbon solvent such as in benzene. The resulting hydroxymethylene derivative is benzoylated by the action of either benzoic anhydride or benzoyl chloride and pyridine; and the benzoic ester is then hydrogenated in the presence of a noble metal catalyst to yield the desired α-methylarylacetonitrile, which is then hydrolyzed as above.

The desired α-methylarylacetonitrile can optionally be prepared by the following series of reactions (Sequence IV); the aryloxy- or arylthioacetophenone (prepared by the method of an Ullman ether synthesis) is reduced either with hydrogen in the presence of a noble metal catalyst or with a metal hydride, such as lithium aluminum hydride, lithium or sodium borohydride, or the like, to the corresponding carbinol. Conversion of this carbinol to the corresponding bromide can be accomplished by treating the carbinol with phosphorus tribromide, preferably in an inert solvent such as chloroform, benzene, carbon tetrachloride, and the like. The bromide thus obtained is then reacted with sodium cyanide advantageously in a dimethyl sulfoxide solution to yield a nitrile which is hydrolyzed, as set forth above, to the desired carboxylic acid.

An alternate method of synthesizing α-alkyl-(m-phenoxyphenyl or m-phenylthiophenyl)acetic acids involves the use of the Arndt-Eistert reaction, as illustrated in sequence V, using a m-phenoxy- or m-phenylthiobenzoic acid as the starting material.

The α-alkyl acids so obtained can be resolved into their d- and l-isomers by methods known in the art.

The desired phenoxyphenyl alkanoic acids can also be prepared by the Willgerodt reaction (Sequence VI). In this reaction, a m-phenoxyphenyl or m-phenylthiophenyl alkyl ketone is heated with, for example, morpholine and sulfur, and the resulting thioamide hydrolyzed to yield the desired alkanoic acid derivative which can be alkylated by treatment with two equivalents of sodium amide in liquid ammonia, followed by the addition of the alkyl halide or tosylate ($R_1X_2$) as illustrated in sequence IIb.

The acids of this invention in which $n$ is other than 0 can be prepared by well-known methods with the well-known Wittig reaction as illustrated in reaction schemes VIIa and VIIb. The intermediate unsaturated esters (as in VIIa) or nitriles (as in VIIb) can be hydrogenated in the presence of a noble metal catalyst, such as platinum, and the resulting saturated esters and nitriles can be hydrolyzed, as set forth above, to the desired carboxylic acids.

(C) ESTERS

VIIIa 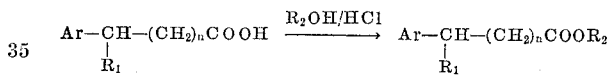

VIIIb. 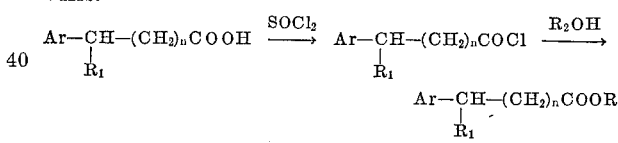

The carboxylic acids prepared by methods described in the above reaction sequences are converted to the corresponding esters by well-known methods of the prior art such as by heating the acid with an alcohol in the presence of a mineral acid (VIIIa), or by converting the acid to the corresponding acid chloride, followed by reacting said acid chloride with an alcohol, preferably in the presence of an HCl scavenger (VIIIb).

(D) AMIDES

IX 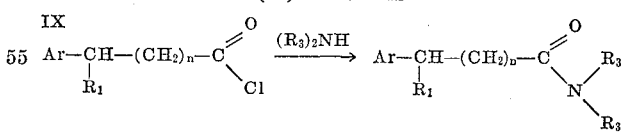

The amides of this invention are obtained by the reaction of the aforementioned acid chloride with an amine. This reaction is customarily carried out in an inert solvent such as chloroform, benzene, or carbon tetrachloride, in the presence of an acid scavenger such as pyridine, $K_2CO_3$, and the like, or in a tertiary amine solvent such as collidine, lutidine, triethylamine, and the like.

(E) ALCOHOL

X 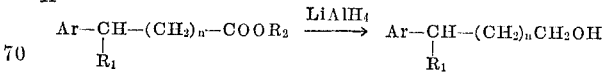

The esters whose preparation is outlined above can be reduced with a metal hydride such as, for example, lithium aluminum hydride, to the corresponding alcohol by the methods of the prior art.

(F) ETHERS

XIa

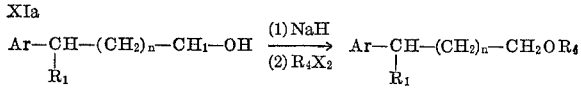

The alcohols obtained above can be converted to the corresponding ethers by treating the alcohol with a basic salt-forming reagent such as an alkali metal, alkoxide, or hydride, preferably in solution in dimethylformamide or dimethylacetamide. Reaction of the thus-formed salt with an alkyl halide or tosylate ($R_4X_2$) yields the desired ether.

(G) ESTERS

XIb

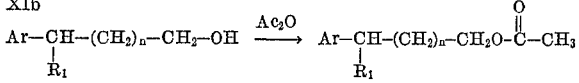

The alcohols obtained as set forth in reaction sequence X can be converted to ester derivatives by well-known methods, such as, for example, treatment of the alcohol with an acid chloride or acid anhydride, preferably in the presence of a tertiary amine such as pyridine or triethylamine. Such a reaction using acetic anhydride, for example, yields the desired acetate ester.

(H) CARBAMATES

XIc

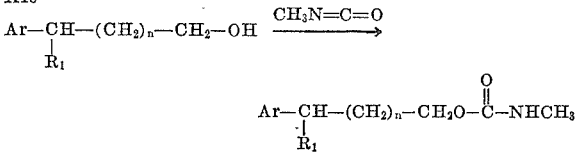

Carbamate derivatives of the alcohols obtained as in reaction sequence X can also be prepared, either by reaction of the alcohol with an iso-cyanate or by reaction of the alcohol with a carbamoyl halide, such as N,N-dimethylcarbamoyl chloride. These reactions are preferably conducted using a tertiary amine solvent, such as pyridine or triethylamine.

(I) AMINES

XIIa

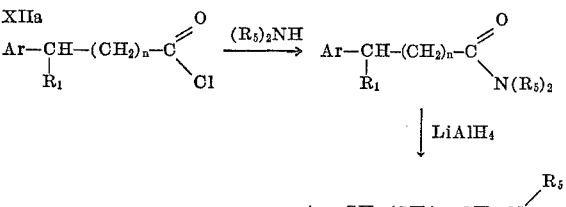

XIIb

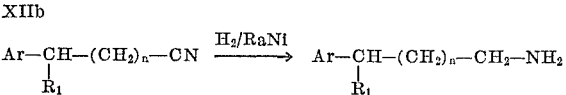

XIIc

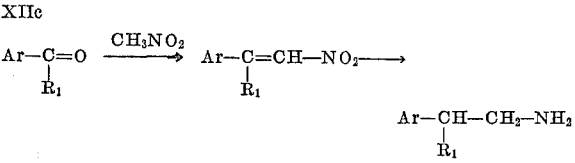

The amine derivatives of this invention can be prepared by well-known procedures, such as, for example, reduction of an amide with a metal hydride reagent such as lithium aluminum hydride (Sequence XIIa). In those cases where primary amines are desired, these can conveniently be prepared by hydrogenation of the corresponding nitriles in the presence of ammonia and an active catalyst, such as Raney nickel (Sequence XIIb).

A suitably substituted aryl alkyl ketone may optionally be condensed with nitromethane and the resulting nitrostyrene derivative can then be reduced either catalytically or with a metal hydride reagent such as lithium aluminum hydride, to yield the desired amine (Reaction Sequence XIIc).

(J) AMINE DERIVATIVES, UREAS AND AMIDES

XIIIa

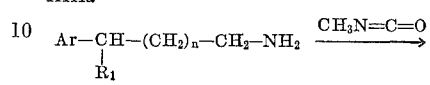

XIIIb

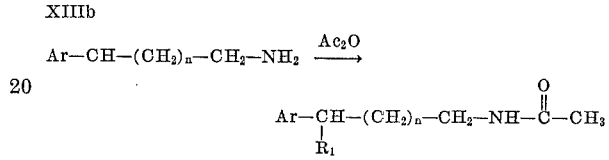

Derivatives of the amines prepared as outlined above can be prepared by standard methods as illustrated in sequences XIIIa and XIIIb. The amine can be caused to react with an isocyanate, such as methyl iso-cyanate, preferably in pyridine solution, yielding a urea derivative (Sequence XIIIa). Alternately, the amine may be converted, if desired, to an amide derivative (Sequence XIIIb) by well-known procedures. When the amine is treated with, for example, acetic anhydride in pyridine solution, the corresponding N-acetyl derivative is formed.

(K) HYDROXAMIC ACIDS

XIV

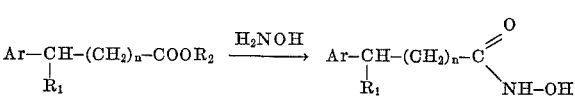

The esters prepared according to reaction sequence VIIIa and VIIIb can be converted into hydroxamic acids by treatment with hydroxylamine by well-known procedures.

(L) TETRAZOLES

XV

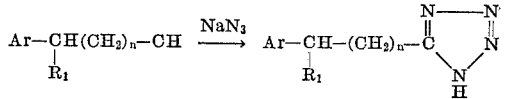

Nitriles which are prepared by the methods of sequences I, IIa, III, or IV, or by other well-known methods, can be converted to the corresponding tetrazoles by treating them with, for example, sodium azide, using dimethylformamide as the reaction solvent (in the manner described by Finnigan, W. G. Henry, R. A., and Lofquist, R., J. Am. Chem. Soc., 80, 3908 (1958)).

The starting materials of the foregoing reactions are readily obtained from an Ullman diaryl ether synthesis such as that reported by Bacon and Stewart, J. Chem. Soc. (London), 4953 (1965) and represented by the following reaction:

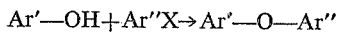

wherein Ar' represents an unsubstituted phenyl moiety and Ar" represents the substituted phenyl moiety,

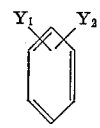

of general Formula I.

Typical intermediates which were prepared from the above reaction are as follows:

3-phenoxyacetophenone, B.P., 117–126° C./0.08 mm.; $n_D^{25}=1.5865$, 4-chloro-5-methyldiphenyl ether, B.P., 105–113° C./0.06 mm.; $n_D^{24.5}=1.5850$, 2-chloro-5-methyldiphenyl ether, B.P., 120–123° C./0.08 mm.; $n_D^{25.5}=1.5850$, 4-fluoro-5-methyldiphenyl ether, B.P., 75–85° C./0.05 mm.; $n_D^{24}=1.5565$, 4-methyl-5-phenoxyacetophenone, B.P., 120–132° C./0.05 mm.; $n_D^{25}=1.5828$, 2-methoxy-5-phenoxyacetophenone, B.P., 132–140° C./0.15 mm.; $n_D^{25}=1.5864$.

The following examples further illustrate the present invention.

EXAMPLE 1

Preparation of 2-(3-phenoxyphenyl)acetic acid

To 26 ml. of morpholine were added 42.4 g. of m-phenoxyacetophenone and 9.6 g. of sulfur. The reaction mixture was refluxed with stirring for 20 hours. To the reaction mixture was then added 700 ml. of 15 percent aqueous potassium hydroxide and a small amount of ethyl alcohol. The reaction mixture was refluxed with stirring for an additional 20 hours. About 200 ml. of the solvent was distilled out. The remaining reaction mixture was filtered while hot, partially cooled with ice, and acidified with concentrated hydrochloric acid, whereupon an oily precipitate formed and then crystallized. The crystalline precipitate was filtered, washed several times with water, and dried to yield 45.9 g. of crude product as a yellow-orange solid. The crude product was suspended in boiling hexane, and ethyl acetate was added until the product went into solution. The solution was then treated with carbon, filtered and cooled, to yield 22.7 g. of white flakes of 2-(3-phenoxyphenyl)acetic acid, M.P. 84–86° C.; pK'a=6.9.

Analysis.—Calc. for $C_{14}H_{12}O_3$ (percent): C, 73.66; H, 5.30. Found (percent): C, 73.85; H, 5.35.

EXAMPLES 2–6

The following compounds were prepared according to the method of Example 1, from the corresponding phenoxyacetophenone, using appropriate amounts of sulfur and morpholine.

2 - (4 - methyl - 3 - phenoxyphenyl)acetic acid, M.P., 49–51° C.; pK'a=7.0, from 4-methyl-3-phenoxyacetophenone.

Analysis.—Calc. for $C_{15}H_{14}O_3$ (percent): C, 74.36; H, 5.83. Found (percent): C, 74.45; H, 5.88.

2 - (4 - methoxy - 3 - phenoxyphenyl)acetic acid, M.P., 85–87.5° C.; pK'a=6.9, from 4-methoxy-3-phenoxyacetophenone.

Analysis.—Calc. for $C_{15}H_{14}O_4$ (percent): C, 69.75; H, 5.46. Found (percent): C, 69.47; H, 5.30.

2 - (2 - methoxy - 5 - phenoxyphenyl)acetic acid, M.P., 90–94° C.; pK'a=7.4, from 2-methoxy-5-phenoxyacetophenone.

Analysis.—Calc. for $C_{15}H_{14}O_4$ (percent): C, 69.75; H, 5.46. Found (percent): C, 69.58; H, 5.61.

2 - (2 - methyl - 5 - phenoxyphenyl)acetic acid, B.P., 153–163° C./0.16 mm.; pK'a=6.9, from 2-methyl-5-phenoxyacetophenone.

Analysis.—Calc. for $C_{15}H_{14}O_3$ (percent): C, 74.36; H, 5.83. Found (percent): C, 72.08; H, 5.82.

2 - (3 - phenylthiophenyl)acetic acid, M.P., 82–84° C., pK'a=7.1, from 3-phenylthiophenylacetorphenone.

Analysis.—Calc. for $C_{14}H_{12}O_2S$ (percent): C, 68.86; H, 4.95; S, 13.12. Found (percent): C, 69.09; H, 5.17; S, 13.06.

EXAMPLES 7–13

The following compounds are prepared according to the method of Example 1 from the corresponding phenoxyacetophenone, using appropriate amounts of sulfur and morpholine.

2-(2-ethyl-3-phenoxyphenyl)acetic acid from 2-ethyl-3-phenoxyacetophenone.

2-(4-n-propyl-3-phenoxyphenyl)acetic acid from 4-n-propyl-3-phenoxyacetophenone.

2-(5-iso-propyl-3-phenoxyphenyl)acetic acid from 5-isopropyl-3-phenoxyacetophenone.

2-(4-trifluoromethyl-3-phenoxyphenyl)acetic acid, from 4-trifluoromethyl-3-phenoxyacetophenone.

2-(2-ethyl-5-phenylthiophenyl)acetic acid, from 2-ethyl-5-phenylthioacetophenone.

2-(2-n-pentyl-3-phenylthiophenyl)acetic acid from 2-n-pentyl-3-phenylthioacetophenone.

2-(2,5-diethyl-3-phenylthiophenyl)acetic acid, from 2,5-diethyl-3-phenylthioacetophenone.

EXAMPLE 14

2-(4-chloro-3-phenoxyphenyl)acetic acid

To 1,200 ml. of carbon tetrachloride were added 232.7 g. of 3-phenoxy-4-chlorotoluene, 196 g. of N-bromosuccinimide and 1.0 g. of benzoyl peroxide. The reaction mixture was stirred and refluxed for 24 hours, after which time, the reaction mixture was filtered and the solids washed with carbon tetrachloride. The filtrate was evaporated to an oil and distilled to yield fractions A, B, and C of crude 4-chloro-3-phenoxybenzylbromide.

| Fraction | B.P. (mm.) | Weight (g.) | $n_D^{25}$ |
| --- | --- | --- | --- |
| A | 140–150 (0.08) | 118.5 | 1.5960 |
| B | 145–153 (0.07) | 190.6 | 1.6152 |
| C | 145–160 (0.07) | 79.4 | 1.6250 |

Fractions B and C were combined and analyzed.

Analysis.—Calc. for $C_{13}H_{10}BrClO$ (percent): C, 52.46; H, 3.38. Found (percent): C, 52.25; H, 3.44.

The combined fractions B and C were redistilled through a Vigreux column to yield fractions A, B, C, D, and E.

| Fraction | B.P. (mm.) | Weight (g.) | $n_D^{25}$ |
| --- | --- | --- | --- |
| A | 105–145 (0.09) | 24.2 | 1.5951 |
| B | 145–155 (0.09) | 29.6 | 1.6114 |
| C | 130–136 (0.07) | 79.4 | 1.6228 |
| D | 128–135 (0.07) | 52.9 | 1.6218 |
| E | 136–149 (0.06) | 29.8 | 1.6274 |

NMR studies indicated that fractions C and D contained 91 and 92 percent of 4-chloro-3-phenoxyphenylbromide, respectively.

In approximately 400 ml. of dimethylsulfoxide were dissolved 22.2 g. of 95 percent sodium cyanide and the reaction mixture warmed to about 50° C. The crude 4 - chloro - 3 - phenoxybenzylbromide (125 g.) was added dropwise with stirring. The temperature was maintained at between 50–60° C. during the bromide addition. A red color formed immediately upon the addition of the bromide. After the bromide addition was complete, the reaction mixture was heated to 60° C. and stirred for 3 hours. The mixture was then allowed to cool to room temperature and stirred overnight, after which time it was poured onto ice and extracted with ethyl ether and then with hexane. The extracts were washed with water and dried over sodium sulfate. The solvents were evaporated, yielding a reddish-brown viscous oil which was distilled to yield fractions A, B, and C of 2-(4-chloro-3-phenoxyphenyl)acetonitrile.

| Fraction | B.P. (mm.) | Weight (g.) | $n_D^{25}$ |
| --- | --- | --- | --- |
| A | 170(0.4)–170(0.15) | 51.6 | 1.5916 |
| B | 163–174(0.08) | 16.3 | 1.5917 |
| C | 174–190(0.10) | 2.2 | 1.5917 |

Analysis.—Calc. for $C_{14}H_{10}ClNO$ (percent): C, 68.99; H, 4.13; N, 5.74. Found (percent): C, 68.72; H, 4.20; N, 5.50.

Acid hydrolysis of the nitrile produced the corresponding 2-(4-chloro-3-phenoxyphenyl)acetic acid. To 500 ml. of concentrated hydrochloric acid was added 50.9 g. of the above nitrile. The reaction mixture was stirred and heated to 85° C. for 24 hours. Five hundred milliliters of distilled water was added to the reaction mixture which was then heated with stirring at 105° C. for 4 hours (refluxed gently). The reaction mixture was then poured into a large volume of ice and water. The reaction was then extracted twice with ethyl ether. The combined ether phases were washed with water, and extracted with dilute sodium carbonate. The extract was then washed with ethyl ether and acidified by dropwise addition of 6 N hydrochloric acid while stirring. The voluminous white precipitate thus obtained was filtered and washed with water and dried in vacuo to yield 34.2 g. of white crystalline 2-(4-chloro-3-phenoxyphenyl)acetic acid, M.P. 77–80° C.

EXAMPLES 15–16

The following compounds were prepared by the method of Example 14 from the corresponding toluenes using appropriate amounts of N-bromo succinimide, benzoyl peroxide, and sodium cyanide.

2-(2-chloro - 5 - phenoxyphenyl)acetic acid, M.P., 88–90° C.; pK′a=6.8.

*Analysis.*—Calc. for $C_{14}H_{11}ClO_3$ (percent): C, 64.00; H, 4.22. Found (percent): C, 63.73; H, 4.32.

2-(2-fluoro-5-phenoxyphenyl)acetic acid, M.P. 80–82° C.; pK′a=6.65.

*Analysis.*—Calc. for $C_{14}H_{11}FO_3$ (percent): C, 68.28; H, 4.50. Found (percent): C, 68.08; H, 4.43.

EXAMPLES 17–24

The following compounds are prepared according to the method of Example 14 using appropriate starting materials:

2-(2-iodo-3-phenylthiophenyl) acetic acid
2-(2,5-dimethoxy-3-phenoxyphenyl)acetic acid
2-(5-chloro-3-phenylthiophenyl)acetic acid
2-(2-chloro-3-phenoxyphenyl)acetic acid
2-(5-fluoro-3-phenylthiophenyl)acetic acid
2-(5-bromo-3-phenoxyphenyl)acetic acid
2-(2-chloro-5-methyl-3-phenoxyphenyl)acetic acid
2-(4,6-dichloro-3-phenoxyphenyl)acetic acid

EXAMPLE 25

Preparation of 2-(3-phenoxyphenyl)propionic acid (A) 3-phenoxyacetophenone.—A mixture consisting of 908 g. (6.68 moles) of m-hydroxyacetophenone, 4500 g. (28.6 moles) of bromobenzene, 996 g. (7.2 moles) of anhydrous potassium carbonate, and 300 g. of copper bronze was heated under reflux with stirring until water evolution was complete, using a Dean-Stark water separator. The mixture was then stirred and refluxed for 24 hours. After cooling to room temperature, the reaction was diluted with an equal volume of $CHCl_3$ and filtered. The filtrate was washed with 5 percent HCl, then with 5 percent NaOH, with water, dried over $Na_2SO_4$, and evaporated in vacuo. The residual oil was distilled through a 15 cm. Vigreux column, yielding 918 g. of 3-phenoxyacetophenone, B.P., 120–121° C. (0.09 mm.), $$n_D^{25}=1.5868$$

*Analysis.*—Calc. for $C_{14}H_{12}O_2$ (percent): C, 79.22; H, 5.70. Found (percent): C, 79.39; H. 5.79.

(B) α-Methyl-3-phenoxybenzyl alcohol.—A stirred solution of 700 g. of m-phenoxyacetophenone in 3000 ml. anhydrous methanol was cooled to 0° in an ice-acetone bath. Sodium borohydride, 136 g. (3.6 moles) was added to this solution in small portions at such a rate that the temperature never rose above 10° C. After borohydride addition was complete, the reaction mixture was allowed to warm to room temperature and stirred for 18 hours. It was then stirred and refluxed for 8 hours. About 400 ml. of methanol was distilled out and the remaining solution was evaporated to about one-third its original volume in vacuo and poured into ice water. This mixture was extracted twice with ether, acidified with 6 N HCl, and again extracted with ether. The ether extracts were combined, washed with saturated NaCl solution, dried over anhydrous sodium sulfate, and evaporated in vacuo. The residual oil was distilled through a 15 cm. Vigreux column, yielding 666 g. of α-methyl-3-phenoxybenzyl alcohol, B.P., 132–134° C. (0.35 mm.). $n_D^{25}=1.5809$.

*Analysis.*—Calc. for $C_{14}H_{14}O_2$ (percent): C, 78.48; H, 6.59. Found (percent): C, 78.75; H, 6.31.

(C) α-Methyl-3-phenoxybenzyl bromide.—A stirred solution of 1357 g. of α-methyl-3-phenoxybenzyl alcohol in 5000 ml. anhydrous $CCl_4$ (predried over molecular sieve) was cooled to 0° C. To this was added 1760 g. $PBr_3$, stirring and cooling being maintained at such a rate that the temperature remained at 0–5° C. during the addition. The reaction mixture was then allowed to warm to room temperature and was stirred at room temperature overnight (ca. 12 hours). The reaction mixture was then poured into ice water and the organic phase separated. The aqueous phase was extracted with $CCl_4$ and the combined extracts were washed three times with water, dried over anhydrous sodium sulfate, and evaporated to dryness in vacuo to yield 1702 g. of α-methyl-3-phenoxybenzyl bromide as a heavy viscous oil, $n_D^{25}=1.5993$.

*Analysis.*—Calc. for $C_{14}H_{13}BrO$ (percent): C, 60.44; H, 4.71; Br, 28.73. Found (percent): C, 60.62; H, 4.89; Br, 28.47.

(D) 2 - (3 - phenoxyphenyl)propionitrile.—A well-stirred suspension of 316 g. of 98 percent sodium cyanide in 5000 ml. of anhydrous dimethyl sulfoxide (previously dried over molecular sieve) was warmed to 55–60° C. and maintained at this temperature while 1702 g. of α-methyl-3-phenoxybenzyl bromide was slowly added. After the bromide addition was completed, the temperature was raised to 75° C., and the mixture stirred at this temperature for 1.5 hours. The mixture was then allowed to cool to room temperature, and was stirred overnight at room temperature and then poured into ice water. The resulting aqueous suspension was extracted twice with ethyl acetate, and then with ether. The organic extract was washed twice with a sodium chloride solution, once with water, and dried over anhydrous sodium sulfate. Evaporation of the solvent in vacuo left an oily residue which was distilled through a 15 cm. Vigreux column to yield 1136 g. of 2-(3-phenoxyphenyl)propionitrile, B.P., 141–148° C. (0.1 mm.), $n_D^{25}=1.5678$.

*Analysis.*—Calc. for $C_{15}H_{13}NO$ (percent): C, 80.69; H, 5.87; N, 6.27. Found (percent): C, 80.89; H, 6.10; N, 6.14.

(E) 2-(3 - phenoxyphenyl)propionic acid.—A mixture of 223 g. of 2-(3-phenoxyphenyl)propionitrile and 400 g. of sodium hydroxide in 1600 ml. of 50 percent ethanol was refluxed with stirring for 72 hours. After cooling to room temperature, the reaction mixture was poured into ice water. The resulting solution was washed with ether, acidified with concentrated HCl, and extracted with ether. The ether extract was washed with water, dried over anhydrous sodium sulfate, and evaporated to dryness in vacuo. The residual oil was distilled to yield 203.5 g. (84 percent) of 2-(3-phenoxyphenyl)propionic acid as a viscous oil; B.P., 168–171° C. (0.11 mm.), $n_D^{25}=1.5742$, pK′a=7.3.

*Analysis.*—Calc. for $C_{15}H_{14}O_3$ (percent): C, 74.36; H, 5.83. Found (percent): C, 74.48; H, 6.05.

EXAMPLE 26

2-(3-phenoxyphenyl)propionic acid, sodium salt, dihydrate 2-(3-phenoxyphenyl)propionic acid (6460 g.) was converted to the sodium salt by adding it batchwise to 26.7 moles of 2 N sodium hydroxide with stirring and cooling. The aqueous solutions were then evaporated to near dryness in vacuo. The semi-dry residues were then stirred with ethyl acetate and again evaporated in vacuo. The white solid residues were dissolved in the smallest possible amount of boiling ethyl acetate, filtered into a large container (about 18 liters of solution), and allowed to stand at 7° C. overnight. The resulting crystalline mass was filtered and dried in vacuo at room temperature, yielding 6954 g. of pure sodium 2-(3-phenoxyphenyl)propionate, dihydrate, M.P., 76–78° C.

*Analysis.*—Calc. for $C_{15}H_{17}O_5Na$ (percent): C, 59.99; H, 5.70. Found (percent): C, 59.93; H, 5.97.

EXAMPLE 27

5-(4-chloro-3-phenoxybenzyl)-1H-tetrazole

A mixture of 17.0 g. of 4-chloro-3-phenoxyphenyl-acetonitrile, 5.0 g. of sodium azide, 4.15 g. of ammonium chloride, and a trace amount of lithium chloride in 80 ml. of dimethylformamide (dried over a molecular sieve) was stirred and heated at 125° C. for 12 hours. The reaction mixture was filtered and the solvents evaporated until a brown oil was obtained. The oil was suspended in approximately 400 ml. of water. After stirring, the pH of the suspension was adjusted to pH 2 by dropwise addition of 3 N HCl. The resulting precipitate was cooled, filtered, washed with ice water, and dried in vacuo. The precipitate was then taken up in boiling 1,2-dichloroethane and allowed to crystallize slowly overnight to yield 14.5 g. of fine white needles of 5-(4-chloro-3-phenoxybenzyl)-1H-tetrazole. M.P., 157–158° C., pK'a=5.7.

*Analysis.*—Calc. for $C_{14}H_{11}ClNO_4$ (percent): C, 58.64; H, 3.86; N, 19.54. Found (percent): C, 58.66; H, 4.07; N, 19.84.

EXAMPLE 28

2-(3-phenoxyphenyl)propionamide

A solution of 0.5 M of 2-(3-phenoxyphenyl)propionyl chloride in 300 ml. of dry ethyl ether was added dropwise to 2 liters of liquid ammonia with stirring. After addition was complete, the reaction was stirred for one hour, and 500 ml. of diethyl ether was added. The reaction was stirred overnight, whereby the excess ammonia was evaporated. Dilute hydrochloric acid was added to the reaction. The ether layer was separated, washed with sodium hydroxide, water, and dried over sodium sulfate. Evaporation of the ether in vacuo left a gummy residue which crystallized after trituration with cold hexane. Recrystallization from ethyl acetate and hexane yielded 76.2 g. of 2-(3-phenoxyphenyl)propionamide, M.P., 67–69° C.

*Analysis.*—Calc. for $C_{15}H_{15}NO_2$ (percent): C, 74.66; H, 6.27; N, 5.81. Found (percent): C, 74.01; H, 6.30; N, 6.15.

EXAMPLE 29

Methyl 2-(3-phenoxyphenyl)acetate 2-(3-phenoxyphenyl)acetic acid is dissolved in chloroform, stirred, and thionyl chloride in chloroform is added slowly. The reaction mixture is refluxed gently with stirring for about 3 hours, and then evaporated to dryness to yield the corresponding acid chloride. The acid chloride is taken up in chloroform and the resulting solution added dropwise with stirring to an excess of cold methyl alcohol. The reaction mixture is cooled to below 10° C., and then allowed to warm to room temperature. The solvent is stripped off on a rotary evaporator and the residue distilled to yield methyl 2-(3-phenoxyphenyl)acetate.

EXAMPLE 30

N,N-dimethyl-2-(3-phenoxyphenyl)propionamide

To 400 ml. of dry chloroform were added 72.6 g. of 2-(3-phenoxyphenyl)propionic acid and 36.9 g. of thionyl chloride. The reaction mixture was refluxed with stirring for about 3 hours. The chloroform was then evaporated and the residue azeotroped twice with benzene. The residue was dissolved in ethyl ether and added, with stirring and cooling, to a solution of 45 g. of dimethylamine in ethyl ether. The temperature was maintained at approximately 0° C. or below during the addition. The reaction mixture was allowed to warm to room temperature, refluxed gently for 1.5 hours, poured into ice and water, acidified, and the ethyl ether layer separated. The aqueous layer was extracted with ethyl ether. The ether extracts were combined, washed with water, dried over sodium sulfate and evaporated to a white solid. The solid was dissolved in boiling hexane and allowed to cool slowly to room temperature to yield 67.6 g. of N,N-dimethyl-2-(3-phenoxyphenyl)propionamide, M.P., 73.5–76° C.

*Analysis.*—Calc. for $C_{17}H_{19}NO_2$ (percent): C, 75.80; H, 7.11; N, 5.20. Found (percent): C, 75.93; H, 6.90; N, 5.27.

EXAMPLE 31

N,N-dimethyl-2-(3-phenoxyphenyl)propylamine hydrochloride

To a flame dried flask were added, under nitrogen, 6.08 g. of lithium aluminum hydride and 500 ml. of ethyl ether. The mixture was stirred at room temperature for approximately 30 minutes. To the mixture was added dropwise 67.3 g. of N,N-dimethyl-2-(3-phenoxyphenyl)propionamide (prepared according to the method of Example 30) dissolved in 800 ml. of ethyl ether. The reaction mixture was refluxed with stirring overnight. To the reaction mixture was then added 4.65 ml. of water, 3.5 ml. of 20 percent sodium hydroxide, and 16.5 ml. of water. The reaction mixture was then poured onto ice, additional sodium hydroxide was added, and the reaction was extracted with ethyl ether. The ether layer was washed with water and extracted with dilute hydrochloric acid. The acid extract was then washed with ethyl ether, basified with sodium hydroxide, and extracted twice with ethyl ether. The ether extracts were washed with water, dried over sodium sulfate, and evaporated to an oil. The oil was distilled to yield 39.2 g. of N,N-dimethyl-2-(3-phenoxyphenyl)propylamine, B.P., 114–120° C./0.1 mm., M.W. 255.

*Analysis.*—Calc. for $C_{17}H_{21}NO$ (percent): C, 79.96; H, 8.29; N, 5.49. Found (percent): C, 79.76; H, 8.06; N, 5.38.

Thirty-four grams of the above amine were dissolved in approximately 800 ml. of dry ethyl ether, and hydrogen chloride gas was passed into the solution until saturated. The resulting white solid precipitate was filtered, washed with ethyl ether, partially dried, and recrystallized from boiling ethyl alcohol to yield 34.3 g. of N,N-dimethyl-2-(3 - phenoxyphenyl)propylamine hydrochloride, M.P., 215–217° C.

*Analysis.*—Calc. for $C_{17}H_{21}NO \cdot HCl$ (percent): C, 69.96; H, 7.60; N, 4.80. Found (percent): C, 69.68; H, 7.40; N, 4.90.

EXAMPLE 32

N-cyclopropylmethyl-2-(3-phenoxyphenyl)propionamide

To 350 ml. of chloroform were added 60.5 g. of 2-(3-phenoxyphenyl)propionic acid and 30.4 g. of thionyl chloride. The reaction mixture was refluxed with stirring overnight, evaporated, and the residue azeotroped three times with benzene. The resulting oily acid chloride was taken up in chloroform. Forty g. of aminomethylcyclopropane hydrochloride were dissolved in a small amount of water, made basic with 5 N sodium hydroxide, and extracted with chloroform. The aqueous layer was saturated with sodium chloride and again extracted with chloroform. The chloroform extracts were combined and dried over sodium carbonate and sodium sulfate. The extracts were filtered, and 50 ml. of triethylamine added thereto. The mixture was cooled in an ice-acetone bath. To this was added dropwise the chloroform solution of the acid chloride. Cooling and stirring were maintained during the addition.

The reaction mixture was allowed to warm to room temperature, stirred for 30 minutes, warmed to the reflux point, allowed to cool to room temperature, and stirred overnight. The solution was then partially evaporated and poured into an ice-water mixture. The chloroform layer was washed with dilute hydrochloric acid, dried over sodium sulfate, and evaporated to an oily residue. The residue was covered with hexane and scratched, whereupon a crystalline solid formed. The crystalline solid was taken up in boiling ethyl acetate, and hexane was added to turbidity. The solution was allowed to cool to yield 50.6 g. of crystalline N-cyclopropylmethyl-2-(3-phenoxyphenyl)propionamide, M.P., 94.5–96° C.

*Analysis.*—Calc. for $C_{19}H_{21}NO_2$ (percent): C, 77.26; H, 7.17; N, 4.74. Found (percent): C, 77.14; H, 7.17; N, 4.71.

EXAMPLES 33–34

The following compounds were prepared according to the method of Example 30, using appropriate starting materials.

N-methyl-2-(3-phenoxyphenyl)butyramide, M.P., 84–86° C.

*Analysis.*—Calc. for $C_{17}H_{19}NO_2$ (percent): C, 75.81; H, 7.11; N, 5.20. Found (percent): C, 75.60; H, 7.11; N, 5.00.

N-methyl - 2 - (3 - phenoxyphenyl)propionamide, M.P., 57–68° C.

*Analysis.*—Calc. for $C_{16}H_{17}NO_2$ (percent): C, 75.27; H, 6.71; N, 5.49. Found (percent): C, 75.51; H, 6.86; N, 5.61.

EXAMPLES 35–37

The following compounds were prepared according to the method of Example 31, from the corresponding amide using appropriate starting materials.

N-methyl-2-(3 - phenoxyphenyl)butylamine hydrochloride, M.P., 124–126° C.

*Analysis.*—Calc. for $C_{17}H_{21}NO \cdot HCl$ (percent): C, 69.96; H, 7.60; N, 4.80. Found (percent): C, 69.83; H, 7.80; N, 4.87.

N-methyl-2-(3-phenoxyphenyl)propylamine hydrochloride, M.P., 160–162° C.

*Analysis.*—Calc. for $C_{16}H_{19}NO \cdot HCl$ (percent): C, 69.17; H, 7.25; N, 5.04. Found (percent): C, 69.21; H, 7.02; N, 5.30.

N - cyclopropylmethyl - 2 - (3 - phenoxyphenyl)propylamine hydrochloride, M.P., 115–117° C.

*Analysis.*—Calc. for $C_{19}H_{23}NO \cdot HCl$ (percent): C, 71.79; H, 7.61; N, 4.40. Found (percent): C, 71.96; H, 7.46; N, 4.39.

EXAMPLE 38

Resolution of α-dl-2-(3-phenoxyphenyl)propionic acid

Two hundred grams of dl-2-(3-phenoxyphenyl)propionic acid, prepared according to Example 25, were dissolved in 3000 ml. of hot ethyl acetate and 100 g. of d-(+)-α-methylbenzylamine were added to the solution. A crystalline mass separated upon cooling. This was filtered to yield 229 g. of dl-2-(3-phenoxyphenyl)propionic acid, d-(+)-α-methylbenzylamine salt, M.P., 115–126° C. Five successive recrystallizations from hot ethyl acetate yielded 63.5 g. of d-(+)-2-(3-phenoxyphenyl)propionic acid, d-(+)-α-methylbenzylamine salt, M.P. 142–144° C., $[\alpha]_D^{25}$ +14.5° (C=1 percent, CHCl$_3$), $[\alpha]_D^{25}$ +3.74 (C=1 percent, CH$_3$OH).

*Analysis.*—Calc. for $C_{23}H_{25}NO_3$ (percent): C, 76.00; H, 6.93; N, 3.85. Found (percent): C, 75.72; H, 6.80; N, 3.63.

In a similar manner, l-(−)-2-(3-phenoxyphenyl)propionic acid, l-(−)-α-methylbenzylamine salt was prepared, M.P., 141–142° C., $[\alpha]_D^{25}$ −3.63 (C=1 percent, CH$_3$OH).

Fifty-two grams of d-(+)-2-(3-phenoxyphenyl)propionic acid, d-(+)-α-methylbenzylamine salt were suspended between 1.5 l. H$_2$O and 0.5 l. Et$_2$O and acidified by the addition of 6 N HCl. The ether layer was washed with water, dried over sodium sulfate, and evaporated in vacuo to yield d-(+)-2-(3-phenoxyphenyl)propionic acid, $[\alpha]_D^{25}$ +46.0 (C=1 percent, CHCl$_3$).

In a similar manner, l-(−)-2-(3-phenoxyphenyl)propionic acid, $[\alpha]_D^{25}$ −45.7 (C=1 percent, CHCl$_3$) was prepared from l-(−)-2-(3-phenoxyphenyl)propionic acid, l-(−)-α-methylbenzylamine salt.

EXAMPLE 39

(A) 2-(3-phenoxyphenyl)-propylamine

One hundred grams of 2-(3-phenoxyphenyl)propionitrile, prepared according to Example 25D, 10 g. of Raney nickel, 250 ml. of ethyl alcohol, and 150 g. of ammonia were combined in a pressure vessel under an initial hydrogen pressure of 1000 p.s.i. The reaction was maintained under pressure, and heated at 70–80° C., with shaking, for 4 hours, resulting in a 91 percent hydrogen uptake. After cooling and filtering the catalyst, the reaction mixture was poured into ice water, acidified with hydrochloric acid, washed with ethyl ether, basified with 10 percent sodium hydroxide, and extracted with ethyl ether. The ethyl ether layer was washed with water, dried over sodium sulfate, and evaporated to a residual oil, which was distilled to yield 78.9 g. of 2 - (3 - phenoxyphenyl)propylamine B.P. 158–161° C./0.08 mm., $n_D^{25}$=1.5752.

*Analysis.*—Calc. for $C_{15}H_{17}NO$ (percent): C, 79.26; H, 7.54; N, 6.16. Found (percent): C, 79.18; H, 7.29; N, 6.07.

(B) 2-(3-phenoxyphenyl)propylamine hydrochloride

Twenty grams of the above-prepared 2 - (3 - phenoxyphenyl)-propylamine were dissolved in ethyl ether, and the resulting solution was saturated with hydrogen chloride gas, whereupon a solid precipitate formed. The precipitate was filtered, washed with ethyl ether, and dissolved in hot ethyl alcohol. Ethyl ether was added to turbidity, and the reaction mixture was cooled and scratched to yield 18.9 g. of 2-(3-phenoxyphenyl)propylamine hydrochloride, M.P., 147–147.5° C.

*Analysis.*—Calc. for $C_{15}H_{17}NO \cdot HCl$ (percent): C, 68.30; H, 6.88; N, 5.31. Found (percent): C, 68.11; H, 6.58; N, 5.32.

EXAMPLE 40

2-(3-phenoxyphenyl)butyric acid (A) 2 - (3 - phenoxyphenyl)butyronitrile.—Twenty-three grams of sodium were added to 4 liters of liquid ammonia in a 5 liter flask, which contained a catalytic amount of ferric chloride. The reaction was stirred for about 30 minutes. To the resulting reaction were added 209 g. of 2-(3-phenoxyphenyl)acetonitrile, prepared according to reaction sequence I. The reaction was stirred for 30 minutes, and 187.2 g. of ethyl iodide added with stirring. The reaction was then stirred overnight, thereby allowing the ammonia to evaporate. Anhydrous ethyl ether was added to the residue and the mixture was acidified with 6 N hydrochloric acid, and stirred for about one hour. The reaction mixture was then extracted with ethyl ether. The ether layer was washed with water and sodium thiosulfate solution, and the ether was evaporated. The resulting oily residue was distilled to yield 155.2 g. of 2-(3 - phenoxyphenyl)butyronitrile, B.P., 138–140° C./0.14 mm.

(B) One hundred and forty-five grams of the above-prepared 2 - (3 - phenoxyphenyl)butyronitrile were hydrolyzed to the corresponding acid, following the method of Example 25E, to yield 95.9 g. of 2-(3-phenoxyphenyl)butyric acid, M.P. 73–77° C.

*Analysis.*—Calc. for $C_{16}H_{16}O_3$ (percent): C, 74.98; H, 6.29. Found (percent): C, 74.70; H, 6.33.

EXAMPLE 41

Ethyl 2-(3-phenoxyphenyl)propionate

Two hundred grams of 2-(3-phenoxyphenyl)propionic acid, prepared according to Example 25, was dissolved in 1500 ml. of ethanol, and hydrogen chloride gas was passed into the ethanolic solution until it was saturated. The reaction mixture was then refluxed with stirring overnight after which a large portion of the ethanol was evaporated in vacuo, and the resulting reaction mixture was poured into ice water. The reaction mixture was basified with 10 percent sodium hydroxide, and extracted twice with ethyl ether. The combined ether extracts were washed twice with water and dried over sodium sulfate. The ethyl ether was evaporated, leaving crude ethyl 2-(3-phenoxyphenyl)propionate as an oily residue. The preparation was repeated with an additional 200 g. of 2-(3-phenoxyphenyl)propionic acid. The crude residues were combined and distilled through a 15 cm. Vigreux column to yield 339.9 g. of ethyl 2 - (3-phenoxyphenyl)propionate, B.P., 128–134° C./0.15 mm., $n_D^{25}$=1.5458.

*Analysis.*—Calc. for $C_{17}H_{18}O_3$ (percent): C, 75.53; H, 6.71. Found (percent): C, 75.75; H, 6.70.

EXAMPLE 42

2-(3-phenoxyphenyl)propanol

To 27.4 g. of lithium aluminum hydride in a flame dried nitrogen-flushed flask was added approximately one liter of ethyl ether. The mixture was stirred vigorously for 45 minutes. Three hundred grams of ethyl 2 - (3-phenoxyphenyl)propionate, prepared according to Example 41, dissolved in 500 ml. of ethyl ether were then added dropwise to the lithium aluminum hydride suspension at such a rate that a gentle reflux was constantly maintained. After the ester addition was complete, the reaction mixture was stirred and refluxed gently overnight. After cooling the reaction to room temperature, decomposition was achieved by the cautious, dropwise addition of 44.5 ml. of water, 33.3 ml. of 20 percent sodium hydroxide and 155 ml. of water. A large amount of water was then added which formed an emulsion. This became clear when acidified. The reaction was then extracted with ethyl ether, the ether layer separated, and the aqueous layer extracted again with ethyl ether. The ether extracts were combined, washed with water, dried over sodium sulfate and a little sodium carbonate. The dried ether solution was then evaporated to an oily residue. This was distilled to yield 241.6 g. of 2-(3-phenoxyphenyl)propanol, B.P., 128–131° C./0.1 mm., $n_D^{25}$=1.5771.

*Analysis.*—Calc. for $C_{15}H_{16}O_2$ (percent): C, 78.92; H, 7.06. Found (percent): C, 78.65; H, 7.17.

EXAMPLE 43

2-(3-phenoxyphenyl)propyl-N-methylcarbamate

To a solution of 2.51 g. of methyl isocyanate in 75 ml. of dry benzene was added dropwise with stirring at room temperature a solution of 10 g. of 2-(3-phenoxyphenyl)propanol, prepared according to Example 42, in 25 ml. of benzene, and the resulting reaction mixture was refluxed with stirring for 5 hours. The reaction mixture was then evaporated to an oil, and the oil distilled to yield 8.7 g. of 2 - (3 - phenoxyphenyl)propyl - N-methylcarbamate, B.P., 170–180° C./0.1 mm., $n_D^{25}$=1.5615.

*Analysis.*—Calc. for $C_{17}H_{19}NO_3$ (percent): C, 71.56; H, 6.71; N, 4.91. Found (percent): C, 71.64; H, 6.90; N, 4.77.

EXAMPLE 44

2-(3-phenoxyphenyl)propyl acetate

Eleven and four-tenths g. of 2-(3-phenoxyphenyl)propanol, prepared according to Example 42, 7 ml. of acetic anhydride, and approximately 100 ml. of pyridine were combined, and refluxed, with stirring, for 18 hours. Most of the pyridine was evaporated in vacuo, and the residue was dissolved in chloroform, washed with dilute hydrochloric acid, water, and dried over anhydrous sodium sulfate. The chloroform was removed by evaporation in vacuo and the resulting oily residue was distilled, yielding 10.6 g. of 2-(3-phenoxyphenyl)propyl acetate, B.P. 138–145° C./0.1 mm., $n_D^{25}$=1.5478.

*Analysis.*—Calc. for $C_{17}H_{18}O_3$ (percent): C, 75.53; H, 6.71. Found (percent): C, 75.40; H, 6.59.

EXAMPLE 45

2-(3-phenoxyphenyl)propyl propionate 2-(3-phenoxyphenyl)propyl propionate was similarly prepared using appropriate starting materials, B.P. 142–149° C./0.1 mm., $n_D^{25}$=1.5420.

*Analysis.*—Calc. for $C_{18}H_{20}O_3$ (percent): C, 76.03; H, 7.09. Found (percent): C, 75.73; H, 7.32.

EXAMPLE 46

2-(3-phenoxyphenyl)propionohydroxamic acid

Sodium methoxide was prepared by the addition of 5 g. of sodium metal to 150 ml. of methanol. A solution of 7 g. of hydroxylamine hydrochloride dissolved in 100 ml. of methanol was then added to the cooled sodium methoxide solution, and the precipitated sodium chloride removed by filtration. Twenty-five and six-tenths grams of methyl 2-(3-phenoxyphenyl)propionate, prepared according to the method of Example 41, were then added to the filtrate with stirring. The reaction mixture was stirred at room temperature for one-half hour and then refluxed, with stirring, for one and one-half hours. The reaction mixture was then cooled and acidified by the dropwise addition of 6 N hydrochloric acid. After partial solvent removal in vacuo, a yellow oil formed, which subsequently crystallized. Recrystallization from a small amount of ethyl acetate and methylcyclohexane yielded 12.2 g. of 2-(3-phenoxyphenyl)propionohydroxamic acid, M.P. 121–122° C.

*Analysis.*—Calc. for $C_{15}H_{15}NO_3$ (percent): C, 70.02; H, 5.88; N, 5.44. Found (percent): C, 69.95; H, 5.96; N, 5.41.

EXAMPLE 47

1-methyl-3-[2-(3-phenoxyphenyl)propyl]urea

Four and nine-tenths grams of 2-(3-phenoxyphenyl)propylamine, prepared according to the method of Example 39, dissolved in 15 ml. of pyridine were treated with a solution of 1.43 g. of methylisocyanate in 10 ml. of pyridine. The resulting mixture was heated almost to reflux for 2 hours and then stirred overnight at room temperature. The reaction mixture was then warmed briefly, and the pyridine removed by evaporation in vacuo. The resulting gummy residue crystallized after trituration with cold hexane. Recrystallization from ethyl acetate and hexane afforded 4.5 g. of 1-methyl-3-[2-(3-phenoxyphenyl)propyl]urea, M.P. 64.5–66° C.

*Analysis.*—Calc. for $C_{17}H_{20}N_2O_2$ (percent): C, 71.80; H, 7.09; N, 9.85. Found (percent): C, 71.74; H, 7.08; N, 9.92.

EXAMPLE 48

3-(3-phenoxyphenyl)butyric acid (A) *Ethyl 3-(3-phenoxyphenyl)crotonate.*—Two hundred and twenty-four grams of triethyl phosphonoacetate were slowly added to 48 g. of a 50 percent sodium hydride dispersion suspended in 500 ml. of monoglyme with stirring. Two hundred and twelve grams of m-phenoxyacetophenone dissolved in 1500 ml. of monoglyme were added dropwise and stirred for 1 hour. The reaction was then refluxed overnight, cooled to room temperature, and decomposed by adding water thereto. After solvent evaporation in vacuo, the crude product was dissolved in ethyl acetate, washed twice with water, and dried over sodium sulfate. Evaporation of the ethyl acetate left an oily residue which was distilled to yield 52.6 g. of ethyl 3-(3-phenoxyphenyl)crotonate, B.P. 163–170° C./0.2 mm., $n_D^{25}$=1.5770.

(B) *Ethyl 3-(3-phenoxyphenyl)butyrate.* — One hundred and ninety-seven grams of the above-prepared ethyl 3-(3-phenoxyphenyl)crotonate dissolved in 400 ml. of ethanol were hydrogenated in the presence of 5 g. of platinum oxide. The ethanol was evaporated in vacuo leaving an oily residue which was distilled to yield 160 g. of ethyl 3-(3-phenoxyphenyl)butyrate, B.P. 137–139° C./0.06 mm., $n_D^{25}=1.5401$.

(C) 3-(3-phenoxyphenyl)butyric acid.—One hundred and sixty grams of the above-prepared ethyl 3-(3-phenoxyphenyl)butyrate were hydrolyzed according to the method of Example 25E to yield 117.2 g. of 3-(3-phenoxyphenyl)butyric acid, B.P. 193–195° C./0.23 mm., $n_D^{25}=1.5687$, pK'a=7.2.

Analysis.—Calc. for $C_{16}H_{16}O_3$ (percent): C, 74.98; H, 6.29. Found (percent): C, 75.18; H, 6.41.

The present invention includes within its scope pharmaceutical compositions comprising, as an active ingredient, at least one of the compounds of this invention in association with a pharmaceutical carrier or diluent. The compounds of this invention exhibit both oral and parenteral activity and can be formulated in dosage forms for oral, parenteral, rectal, or topical administration.

Solid dosage forms for oral administration include capsules, tablets, pills, powders, and granules. In such solid dosage forms, the active compound is admixed with at least one inert diluent such as sucrose, lactose, or starch. Such dosage forms can also comprise, as is normal practice, additional substances other than inert diluents, e.g., lubricating agents such as magnesium stearate. In the case of capsules, tablets, and pills, the dosage forms may also comprise buffering agents. Tablets and pills can additionally be prepared with enteric coatings.

Liquid dosage forms for oral administration include pharmaceutically acceptable emulsions, solutions, suspensions, syrups, and elixirs containing inert diluents commonly used in the art, such as water. Besides inert diluents, such compositions can also include adjuvants, such as wetting agents, emulsifying and suspending agents, and sweetening, flavoring, and perfuming agents.

Preparations according to this invention for parenteral administration include sterile aqueous or non-aqueous solutions, suspensions, or emulsions. Examples of non-aqueous solvents or vehicles are propylene glycol, polyethylene glycol, vegetable oils, such as olive oil, and injectable organic esters such as ethyl oleate. Such dosage forms may also contain adjuvants such as preserving, wetting, emulsifying, and dispersing agents. They may be sterilized by, for example, filtration through a bacteria-retaining filter, by incorporating sterilizing agents into the compositions, by irradiating the compositions, or by heating the compositions. They can also be manufactured in the form of sterile solid compositions which can be dissolved in sterile water, or some other sterile injectable medium immediately before use.

Compositions for rectal administration are suppositories which may contain in addition to the active substance, excipients such as cocoa butter or a suppository wax.

The dosage of active ingredient in the compositions of this invention may be varied; however, it is necessary that the amount of the active ingredient shall be such that a suitable dosage form is obtained. The selected dosage depends upon the desired therapeutic effect, on the route of administration, and on the duration of the treatment. Generally, dosage levels of between 0.5 to 50 mg./kg. of body weight daily are administered to mammals to obtain effective relief of inflammation, pain, and fever.

The following examples further illustrate the pharmaceutical compositions which are a feature of this invention.

EXAMPLE 49

Tablets weighting 500 mg. and having the following compositions are prepared:

|  | Mg. |
|---|---|
| 2-(3-phenoxyphenyl)propionic acid, sodium salt, dihydrate | 250 |
| Starch | 190 |
| Colloidal silica | 50 |
| Magnesium stearate | 10 |

EXAMPLE 50

Tablets weighing 200 mg. and having the following compositions are prepared:

|  | Mg. |
|---|---|
| 2-(3-phenoxyphenyl)acetic acid | 50 |
| Starch | 120 |
| Colloidal silica | 27 |
| Magnesium stearate | 3 |

Tablets analogous to those described in Examples 49 and 50 can be prepared by replacing the above active ingredients by the same weight of any other compound coming within the scope of this invention. Such tablets can be enteric coated and can additionally comprise buffering agents and the like.

I claim:
1. A compound of the formula

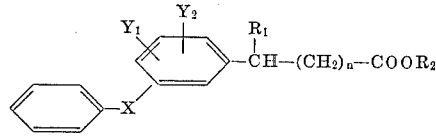

wherein: X is oxygen or sulfur; each of $Y_1$ and $Y_2$ is hydrogen, hydroxy, halo, methyl, ethyl or $C_1$–$C_3$ alkoxy, but $Y_2$ is hydrogen when $Y_1$ is hydroxy or $C_1$–$C_3$ alkoxy; $R_1$ is hydrogen, $C_1$–$C_5$ alkyl, $C_2$–$C_5$ alkenyl, $C_2$–$C_5$ alkynyl or $C_3$–$C_6$ cycloalkyl; $n$ is an integer of from 0 to 3; and $R_2$ is hydrogen, $C_1$–$C_5$ alkyl or an alkali metal, alkaline earth metal, aluminum, ammonium, or substituted ammonium cation.

2. A compound according to claim 1, said compound being 2-(3-phenoxyphenyl)propionic acid or a pharmaceutically acceptable cationic salt thereof.

3. A compound according to claim 1, said compound being 2-(3-phenoxyphenyl)acetic acid or a pharmaceutically acceptable cationic salt thereof.

4. 2-(3-phenoxyphenyl)propionic acid.
5. 2-(3-phenoxyphenyl)propionic acid, sodium salt.
6. 2-(3-phenoxyphenyl)propionic acid, calcium salt.

References Cited

UNITED STATES PATENTS 3,385,886   5/1968   Nicholson _____ 260—515

LEWIS GOTTS, Primary Examiner

E. J. GLEIMAN, Assistant Examiner

U.S. Cl. X.R.

260—308D, 399, 410.9R, 413, 448R, 470, 471R, 473R, 482C, 488CD, 501.1, 501.15, 516, 558S, 559D, 613R, 618R; 424—308, 317, 269